(12) United States Patent
Longenecker et al.

(10) Patent No.: US 8,262,124 B2
(45) Date of Patent: Sep. 11, 2012

(54) FOLDING STROLLER ACTUATING SYSTEM

(75) Inventors: Michael L. Longenecker, Lancaster, PA (US); Bruce L. Williams, Denver, PA (US)

(73) Assignee: Artsana USA, Inc., Lancaster, PA (US)

( * ) Notice: Subject to any disclaimer, the term of this patent is extended or adjusted under 35 U.S.C. 154(b) by 383 days.

(21) Appl. No.: 12/263,792

(22) Filed: Nov. 3, 2008

(65) Prior Publication Data

US 2009/0127828 A1 May 21, 2009

Related U.S. Application Data

(60) Provisional application No. 60/984,622, filed on Nov. 1, 2007.

(51) Int. Cl.
*B62B 7/00* (2006.01)
(52) U.S. Cl. .................. 280/650; 280/642; 280/658
(58) Field of Classification Search .............. 280/642, 280/647, 650, 657, 658, 47.25, 47.38
See application file for complete search history.

(56) References Cited

U.S. PATENT DOCUMENTS

| | | | |
|---|---|---|---|
| 1,598,778 A | 5/1923 | Leake | |
| 1,709,527 A | 4/1929 | Ford | |
| 2,616,719 A | 11/1952 | Heideman | |
| 2,783,053 A | 2/1957 | Sheldrick et al. | |
| 3,112,042 A | 11/1963 | Leshner | |
| 3,168,330 A | 2/1965 | Smith et al. | |
| 3,227,484 A | 1/1966 | Merclean | |
| 3,390,893 A | 7/1968 | MacLaren | |
| 3,459,435 A | 8/1969 | Garner | |
| 3,504,926 A | 4/1970 | Glaser | |
| 3,556,546 A | 1/1971 | Garner | |
| 3,561,787 A | 2/1971 | Toda et al. | |
| 3,653,681 A | 4/1972 | Virtue | |
| 3,784,252 A | 1/1974 | Peterson | |
| 3,799,567 A | 3/1974 | Toda | |
| 3,989,295 A | 11/1976 | Sparkes | |
| 4,007,947 A | 2/1977 | Perego | |

(Continued)

FOREIGN PATENT DOCUMENTS

BE 818905 12/1974

(Continued)

OTHER PUBLICATIONS

Evenflo® Easy Comfort Premier™ Stroller (1999).

(Continued)

*Primary Examiner* — Katy M Ebner
(74) *Attorney, Agent, or Firm* — Volpe and Koenig, P.C.

(57) ABSTRACT

An actuating system for a foldable stroller including a foldable stroller frame having left and right front legs and left and right rear legs and a wheel mounted to each leg. The frame includes an operator handle having left and right support rails extending therefrom and connected to the left and right rear legs. At least one locking member is movably connected to at least one the support rails and biased toward a locking position to secure the connection between the left and right support rails and the left and right rear legs. A support member having an actuator connected thereto is connected between the left and right support rails. The actuator is coupled to the at least one locking member. An operator tray is removably connected to the support member and includes at least one recess formed therein for receiving at least a portion of the actuator.

18 Claims, 12 Drawing Sheets

U.S. PATENT DOCUMENTS

| | | | |
|---|---|---|---|
| 4,023,825 A | 5/1977 | Kassai | |
| 4,046,401 A | 9/1977 | Kassai | |
| 4,111,454 A | 9/1978 | Kassai | |
| 4,126,331 A | 11/1978 | Sloan et al. | |
| 4,191,397 A | 3/1980 | Kassai | |
| 4,232,897 A | 11/1980 | Maclaren et al. | |
| 4,248,443 A | 2/1981 | Ohlson | |
| 4,317,581 A | 3/1982 | Kassai | |
| 4,322,093 A | 3/1982 | Otto | |
| 4,335,900 A | 6/1982 | Fleischer | |
| 4,362,315 A | 12/1982 | Kassai | |
| 4,365,819 A | 12/1982 | Bart | |
| 4,378,946 A | 4/1983 | Voytko et al. | |
| 4,412,688 A | 11/1983 | Giordani | |
| 4,415,180 A | 11/1983 | Payne, Jr. | |
| 4,513,974 A | 4/1985 | Lin | |
| 4,542,915 A | 9/1985 | Wheeler, III et al. | |
| 4,564,212 A | 1/1986 | Orlandino et al. | |
| 4,591,176 A | 5/1986 | Kassai | |
| 4,602,395 A | 7/1986 | Kassai | |
| 4,606,550 A | 8/1986 | Cone | |
| 4,610,460 A | 9/1986 | Kassai | |
| 4,632,420 A | 12/1986 | Miyagi | |
| 4,632,421 A | 12/1986 | Shamie | |
| 4,660,850 A | 4/1987 | Nakao et al. | |
| 4,706,986 A | 11/1987 | Kassai | |
| 4,733,882 A | 3/1988 | Kassai | |
| 4,741,056 A | 5/1988 | Kassai | |
| 4,741,551 A | 5/1988 | Perego | |
| 4,763,911 A | 8/1988 | Gebhard et al. | |
| 4,763,919 A | 8/1988 | Nakao et al. | |
| 4,768,795 A | 9/1988 | Mar | |
| 4,770,437 A | 9/1988 | Glaser | |
| 4,805,928 A | 2/1989 | Nakao et al. | |
| 4,807,928 A | 2/1989 | Cone | |
| 4,817,982 A | 4/1989 | Kassai | |
| 4,819,958 A | 4/1989 | Perego | |
| 4,832,361 A | 5/1989 | Nakao et al. | |
| 4,856,809 A | 8/1989 | Kohus et al. | |
| 4,886,289 A | 12/1989 | Yee et al. | |
| 4,892,327 A | 1/1990 | Cabagnero | |
| 4,906,017 A | 3/1990 | Kassai | |
| 4,907,818 A | 3/1990 | Chai | |
| 4,924,725 A | 5/1990 | Takahashi et al. | |
| D308,656 S | 6/1990 | Takahashi et al. | |
| 4,930,697 A | 6/1990 | Takahashi et al. | |
| D310,645 S | 9/1990 | Julien | |
| 4,953,887 A | 9/1990 | Takahashi et al. | |
| 4,968,092 A | 11/1990 | Giambrone | |
| D317,280 S | 6/1991 | Takahashi et al. | |
| 5,028,061 A | 7/1991 | Hawkes | |
| D320,370 S | 10/1991 | Takahashi et al. | |
| 5,056,805 A | 10/1991 | Wang | |
| 5,074,575 A | 12/1991 | Bigo | |
| 5,087,066 A | 2/1992 | Mong-Hsing | |
| 5,110,150 A | 5/1992 | Chen | |
| 5,143,398 A | 9/1992 | Teng | |
| 5,181,735 A | 1/1993 | Onishi | |
| 5,184,835 A | 2/1993 | Huang | |
| 5,201,535 A | 4/1993 | Kato et al. | |
| 5,205,577 A | 4/1993 | Liu | |
| 5,205,579 A | 4/1993 | Kato et al. | |
| D337,257 S | 7/1993 | Danieli | |
| 5,238,292 A | 8/1993 | Golenz et al. | |
| 5,244,228 A | 9/1993 | Chiu | |
| 5,246,272 A | 9/1993 | Kato et al. | |
| 5,257,799 A | 11/1993 | Cone et al. | |
| D352,017 S | 11/1994 | Kaneko | |
| 5,362,089 A | 11/1994 | Jyan-Tsai | |
| 5,388,852 A | 2/1995 | Bigo et al. | |
| 5,398,951 A | 3/1995 | Ryu | |
| D357,439 S | 4/1995 | Haut et al. | |
| D357,440 S | 4/1995 | Pietra | |
| 5,417,449 A | 5/1995 | Shamie | |
| 5,417,450 A | 5/1995 | Wang | |
| 5,427,402 A | 6/1995 | Huang | |
| 5,431,478 A | 7/1995 | Noonan | |
| 5,437,493 A | 8/1995 | Weisleder | |
| 5,441,163 A | 8/1995 | Carrasco | |
| 5,454,584 A | 10/1995 | Haut et al. | |
| 5,460,395 A | 10/1995 | Chen | |
| 5,460,398 A | 10/1995 | Huang | |
| 5,472,224 A | 12/1995 | Cabagnero | |
| 5,478,102 A | 12/1995 | Haung | |
| 5,489,138 A | 2/1996 | Mariol et al. | |
| 5,511,259 A | 4/1996 | Tarara | |
| 5,511,441 A | 4/1996 | Arai | |
| 5,524,503 A | 6/1996 | Ishikura | |
| 5,527,090 A | 6/1996 | Cone, II | |
| 5,605,409 A | 2/1997 | Haut et al. | |
| 5,622,377 A | 4/1997 | Shamie | |
| 5,645,293 A | 7/1997 | Cheng | |
| 5,649,737 A | 7/1997 | Behnke | |
| 5,664,795 A | 9/1997 | Haung | |
| 5,669,623 A | 9/1997 | Onishi | |
| 5,669,624 A | 9/1997 | Eichhorn | |
| 5,669,625 A | 9/1997 | Cabagnero | |
| 5,676,386 A | 10/1997 | Huang | |
| 5,718,444 A | 2/1998 | Huang | |
| 5,722,682 A | 3/1998 | Wang | |
| 5,727,798 A | 3/1998 | Walters et al. | |
| 5,741,021 A | 4/1998 | Saint et al. | |
| 5,752,738 A | 5/1998 | Onishi et al. | |
| 5,765,855 A | 6/1998 | Chiu | |
| 5,765,856 A | 6/1998 | Kiser | |
| 5,769,447 A | 6/1998 | Huang | |
| 5,772,235 A | 6/1998 | Espenshade | |
| 5,775,718 A | 7/1998 | Huang | |
| 5,795,091 A | 8/1998 | Kakuda et al. | |
| 5,810,432 A | 9/1998 | Haut et al. | |
| 5,845,666 A | 12/1998 | Messner | |
| 5,845,924 A | 12/1998 | Huang | |
| 5,876,057 A | 3/1999 | Huang | |
| 5,887,935 A | 3/1999 | Sack | |
| D412,142 S | 7/1999 | Dickie | |
| 5,921,571 A | 7/1999 | Bell | |
| 5,934,757 A | 8/1999 | Smith | |
| 5,938,229 A | 8/1999 | Chen et al. | |
| 5,947,555 A | 9/1999 | Welsh, Jr. et al. | |
| D415,075 S | 10/1999 | Lan | |
| 5,979,928 A | 11/1999 | Kuo | |
| 5,984,332 A | 11/1999 | Beaudoin et al. | |
| 5,988,669 A | 11/1999 | Freese et al. | |
| 5,988,670 A | 11/1999 | Song et al. | |
| D419,113 S | 1/2000 | Everett | |
| D421,940 S | 3/2000 | Gibson et al. | |
| 6,068,284 A | 5/2000 | Kakuda | |
| 6,070,890 A | 6/2000 | Haut et al. | |
| D427,822 S | 7/2000 | Greger | |
| 6,099,022 A | 8/2000 | Pring | |
| 6,102,431 A | 8/2000 | Sutherland et al. | |
| D431,212 S | 9/2000 | Haung | |
| D431,213 S | 9/2000 | Yang | |
| 6,116,624 A | 9/2000 | Hu | |
| 6,129,373 A | 10/2000 | Cheng | |
| 6,139,046 A | 10/2000 | Aalund et al. | |
| 6,152,476 A | 11/2000 | Huang | |
| 6,155,740 A | 12/2000 | Hartenstine | |
| 6,189,914 B1 | 2/2001 | Worth et al. | |
| 6,193,263 B1 | 2/2001 | Lin | |
| 6,209,829 B1 | 4/2001 | Yu | |
| 6,273,451 B1 | 8/2001 | Julien et al. | |
| 6,286,844 B1 | 9/2001 | Cone, II et al. | |
| 6,296,004 B1 | 10/2001 | Gordon | |
| 6,299,194 B1 | 10/2001 | Chen | |
| 6,302,613 B1 | 10/2001 | Lan | |
| D452,192 S | 12/2001 | Hartenstine et al. | |
| 6,339,862 B1 | 1/2002 | Cheng | |
| 6,368,006 B1 | 4/2002 | Yang et al. | |
| 6,398,233 B1 | 6/2002 | Liang et al. | |
| 6,409,205 B1 | 6/2002 | Bapst et al. | |
| 6,412,809 B1 | 7/2002 | Bigo et al. | |
| 6,443,261 B1 | 9/2002 | Gibson et al. | |
| 6,443,479 B2 | 9/2002 | Huang | |
| 6,446,990 B1 | 9/2002 | Nania et al. | |
| 6,467,739 B1 | 10/2002 | Jou | |
| 6,478,327 B1 | 11/2002 | Hartenstine et al. | |

| | | | |
|---|---|---|---|
| D470,803 S | 2/2003 | Hansen | |
| D473,663 S | 4/2003 | Chou | |
| 6,557,871 B2 | 5/2003 | Hsia | |
| 6,557,885 B1 | 5/2003 | Kakuda | |
| 6,572,134 B2 | 6/2003 | Barrett et al. | |
| 6,581,957 B1 | 6/2003 | Lan | |
| D480,195 S | 9/2003 | Koerlin et al. | |
| 6,666,473 B2 | 12/2003 | Hartenstine et al. | |
| D494,511 S | 8/2004 | Chen | |
| 6,851,700 B2 | 2/2005 | Yoshie et al. | |
| 7,017,921 B2 | 3/2006 | Eros | |
| 7,017,937 B2 | 3/2006 | Williams | |
| 7,032,922 B1 | 4/2006 | Lan | |
| D521,422 S | 5/2006 | Williams | |
| 7,044,497 B2 | 5/2006 | Hartenstine et al. | |
| 7,185,909 B2 | 3/2007 | Espenshade et al. | |
| 7,188,858 B2 * | 3/2007 | Hartenstine et al. | 280/642 |
| D545,074 S | 6/2007 | Loew et al. | |
| 7,281,732 B2 | 10/2007 | Fox et al. | |
| D558,648 S | 1/2008 | Feyler et al. | |
| 7,338,122 B2 | 3/2008 | Hei et al. | |
| D566,629 S | 4/2008 | Taylor | |
| 7,445,229 B2 | 11/2008 | Dotsey et al. | |
| 7,445,230 B2 | 11/2008 | Kassai et al. | |
| 7,475,900 B2 | 1/2009 | Cheng | |
| D593,272 S | 5/2009 | Hailston | |
| D604,151 S | 11/2009 | Kollman et al. | |
| 7,621,431 B2 | 11/2009 | Williams | |
| 7,658,399 B2 | 2/2010 | Van Dijk | |
| 7,686,322 B2 | 3/2010 | Longenecker et al. | |
| D617,255 S | 6/2010 | Tezak et al. | |
| D630,934 S | 1/2011 | Kollman et al. | |
| 7,871,100 B2 | 1/2011 | Chen et al. | |
| D636,300 S | 4/2011 | Greger et al. | |
| 7,938,435 B2 | 5/2011 | Sousa et al. | |
| 8,033,555 B2 | 10/2011 | Mostert et al. | |
| 2005/0012306 A1 | 1/2005 | Lan | |
| 2005/0242549 A1 * | 11/2005 | Longenecker et al. | 280/642 |
| 2006/0001226 A1 | 1/2006 | Refsum | |
| 2006/0131840 A1 * | 6/2006 | Donay | 280/642 |
| 2006/0131841 A1 | 6/2006 | Huang | |
| 2006/0152059 A1 | 7/2006 | Refsum | |
| 2006/0157945 A1 | 7/2006 | Refsum | |
| 2006/0219374 A1 | 10/2006 | McKinney | |
| 2006/0261576 A1 * | 11/2006 | Dotsey et al. | 280/649 |
| 2009/0127827 A1 | 5/2009 | Pike et al. | |
| 2009/0243260 A1 | 10/2009 | Longenecker et al. | |
| 2010/0038886 A1 | 2/2010 | Greger et al. | |
| 2010/0171289 A1 | 7/2010 | Greger et al. | |

FOREIGN PATENT DOCUMENTS

| | | |
|---|---|---|
| DE | 34 07 241 | 2/1984 |
| DE | 35 25 834 | 7/1985 |
| DE | 38 30 752 | 9/1988 |
| DE | 38 30 752 A1 | 9/1988 |
| DE | 40 22 391 | 7/1990 |
| DE | 40 22 391 C1 | 7/1990 |
| DE | 42 29 857 | 9/1992 |
| DE | 42 29 857 A1 | 9/1992 |
| DE | 195 43 273 | 11/1995 |
| DE | 195 43 273 A1 | 11/1995 |
| DE | 196 15 901 | 4/1996 |
| DE | 196 15 901 A1 | 4/1996 |
| DE | 196 38 097 | 9/1996 |
| DE | 196 38 097 A1 | 9/1996 |
| DE | 198 33 857 | 7/1997 |
| DE | 198 33 115 | 7/1998 |
| DE | 198 33 115 A1 | 7/1998 |
| DE | 299 00 901 | 1/1999 |
| DE | 299 00 901 U1 | 1/1999 |
| DE | 200 01 963 U1 | 4/2000 |
| DE | 200 01 964 | 4/2000 |
| DE | 200 01 964 U1 | 4/2000 |
| DE | 200 02 027 | 4/2000 |
| DE | 200 02 027 U1 | 4/2000 |
| DE | 203 11 781 | 10/2003 |
| EP | 0 422 812 | 10/1990 |
| EP | 0 422 812 A1 | 10/1990 |
| EP | 0 639 489 | 8/1994 |
| EP | 0 639 489 A2 | 8/1994 |
| EP | 0 719 693 | 11/1995 |
| EP | 0 719 693 A2 | 11/1995 |
| EP | 0 897 848 | 8/1998 |
| EP | 0 897 848 A1 | 8/1998 |
| EP | 0 901 953 | 3/1999 |
| EP | 0 997 367 | 8/1999 |
| EP | 0 997 367 A2 | 8/1999 |
| EP | 0 994 004 | 4/2000 |
| EP | 1 153 817 | 11/2001 |
| EP | 1 170 193 | 1/2002 |
| EP | 1 160 145 | 12/2004 |
| EP | 1 666 331 | 6/2006 |
| EP | 1 591 339 | 12/2008 |
| ES | 2 016 525 | 8/1989 |
| ES | 2 069 458 | 9/1992 |
| FR | 2 089 832 | 4/1971 |
| FR | 2 244 348 | 9/1973 |
| FR | 2 267 918 | 4/1974 |
| FR | 2 257 482 | 1/1975 |
| FR | 2 323 563 | 9/1975 |
| FR | 2 667 512 | 10/1990 |
| FR | 2 767 509 | 8/1998 |
| GB | 0 690 115 | 5/1950 |
| GB | 690115 | 5/1950 |
| GB | 1 176 516 | 7/1967 |
| GB | 1176516 | 7/1967 |
| GB | 1 394 564 | 12/1973 |
| GB | 1394564 | 12/1973 |
| GB | 1 510 312 | 9/1974 |
| GB | 1510312 | 9/1974 |
| GB | 1 561 594 | 10/1976 |
| GB | 1561594 | 10/1976 |
| GB | 2 124 556 | 6/1982 |
| GB | 2124556 | 6/1982 |
| GB | 2 186 793 | 2/1987 |
| GB | 2186793 | 2/1987 |
| GB | 2 197 784 | 6/1988 |
| GB | 2197784 A | 6/1988 |
| GB | 2 225 557 | 12/1988 |
| GB | 2225557 A | 12/1988 |
| GB | 2 244 029 | 3/1990 |
| GB | 2244029 A | 3/1990 |
| GB | 2 268 394 | 5/1992 |
| GB | 2268394 A | 5/1992 |
| GB | 2 251 830 | 7/1992 |
| GB | 2 318 099 | 10/1996 |
| GB | 2318099 A | 10/1996 |
| GB | 2 324 510 | 3/1998 |
| GB | 2324510 A | 3/1998 |
| GB | 2 342 897 | 10/1999 |
| GB | 2342897 A | 10/1999 |
| IT | 1233953 | 1/1989 |
| JP | 10-35506 | 2/1989 |
| JP | 10-35506 | 2/1998 |
| JP | 10-35506 | 2/1998 |
| JP | 10-035506 | 2/1998 |
| NL | 1009312 | 6/1998 |
| PT | 84257 | 2/1987 |
| PT | 96087 | 12/1990 |
| SU | 1156949 | 4/1983 |
| WO | 88/02714 | 4/1988 |
| WO | 93/07039 | 4/1993 |
| WO | 99/50123 | 10/1999 |
| WO | 00/06437 | 2/2000 |
| WO | 01/28840 | 10/2000 |
| WO | 01/28840 | 4/2001 |
| WO | 2009/065129 | 5/2009 |

OTHER PUBLICATIONS

Evenflo® Light & Easy™ Stroller (1999).
Evenflo® Easy Comfort Classic™ Travel System (1999).
Evenflo® Easy Comfort Plus™ Travel System (1999).
Evenflo® Easy Comfort Premier™ Travel System (1999).
JANE® Twin Two Stroller (printed May 5, 2010).

* cited by examiner

FOLDING STROLLER ACTUATING SYSTEM

CROSS REFERENCE TO RELATED APPLICATION

This Application claims the benefit of U.S. Provisional Application No. 60/984,622, filed on Nov. 1, 2007 which is incorporated by reference as if fully set forth herein.

FIELD OF INVENTION

The present invention relates to an actuating system which provides for one hand operation of a foldable stroller. More particularly, the present invention relates to an actuating system that is pivotally secured to a stroller handlebar.

BACKGROUND

Foldable strollers are well known in the art. Foldable strollers which include one-hand actuated folding mechanism are also well known. One example of such a stroller is that disclosed in U.S. Patent Publication No. 2005/0242549, which is hereby incorporated by reference as if fully set forth herein.

In many foldable strollers, the folding mechanism is difficult to operate or cannot be operated using one hand. Also known are strollers which feature one-hand actuators mounted within an upper parent or operator tray. However, this arrangement is limiting in that the upper tray cannot be removed from the stroller to facilitate cleaning, maintenance, or replacement. In other examples, the actuators are oriented in an open, exposed manner, such as on the handle of the stroller, subjecting them to incidental activation, as well as retracting from the aesthetic appearance of the stroller. Accordingly, there remains a need for a more user friendly stroller folding mechanism that can be operated using one hand.

SUMMARY

The present invention is directed to an actuating system for a foldable stroller. The system includes a foldable stroller frame having left and right front legs and left and right rear legs and a wheel mounted to each leg. The frame further includes an operator handle having left and right support rails extending therefrom. The left and right support rails are connected to the left and right rear legs. At least one locking member is movably connected to at least one the left and right supports rails and biased toward a locking position to secure the connection between the left and right support rails and the left and right rear legs. A support member is connected between the left and right support rails and an actuator is connected to the support member. The actuator is coupled to the at least one locking member. An operator tray is removably connected to the support member. The operator tray includes at least one recess formed therein for receiving at least a portion of the actuator.

The present invention is also directed to an actuator assembly for a foldable stroller frame. The frame includes left and right front legs and left and right rear legs and an operator handle having left and right support rails extending therefrom. The left and right support rails are pivotally connected to the left and right rear legs. The frame further includes a support member connected between the left and right support rails and an operator tray removably connected to the support member and covering a majority of the support member. The operator tray has at least one recess. The actuator assembly also includes at least one locking member movably connected to at least one the left and right support rails. The at least one locking member is biased toward a locking position to secure the connection between the left and right support rails and the left and right rear legs. An actuator control is rotatably connected to the support member. The actuator control is positioned on the support member such that at least a portion of the actuator control is received within the recess of the operator tray. At least one linkage couples the actuator control to the at least one locking member.

The present invention is also directed to a method of folding a stroller. The method includes providing a stroller frame with left and right front legs, left and right rear legs, left and right handlebar supports pivotally connected to the left and right rear legs, and a support bar extending between the left and right handlebar supports; providing an actuator connected to the support bar and movable between a first and a second position; providing an operator tray removably connected to the support bar and covering a majority of the support bar; providing at least one locking member securing the connection between the left and right handlebar supports and the left and right rear legs; providing at least one linkage between the actuator and the at least one locking member; rotating the actuator from the first position to the second position to disengage the locking member from the connection between the left and right handlebar supports and the left and right rear legs; and pivoting the left and right handlebar supports relative to the left and right rear legs to fold the stroller.

BRIEF DESCRIPTION OF THE DRAWINGS

The foregoing summary, as well as the following detailed description of the preferred embodiment of the invention, will be better understood when read in conjunction with the appended drawings. In the drawings.

DETAILED DESCRIPTION OF THE PREFERRED EMBODIMENTS

Certain terminology is used in the following description for convenience only and is not limiting. The words "right,"

"left," "top," "bottom," "side," "front," "rear," "central," "upper," and "lower" designate positions in the attached drawings. The words "inwardly" and "outwardly" refer to directions toward and away from, respectively, the geometric center of the stroller and designated parts thereof.

With reference to FIGS. 1-12, wherein like numerals indicate like elements throughout, the preferred embodiments of the invention will be described below.

Figure 1:
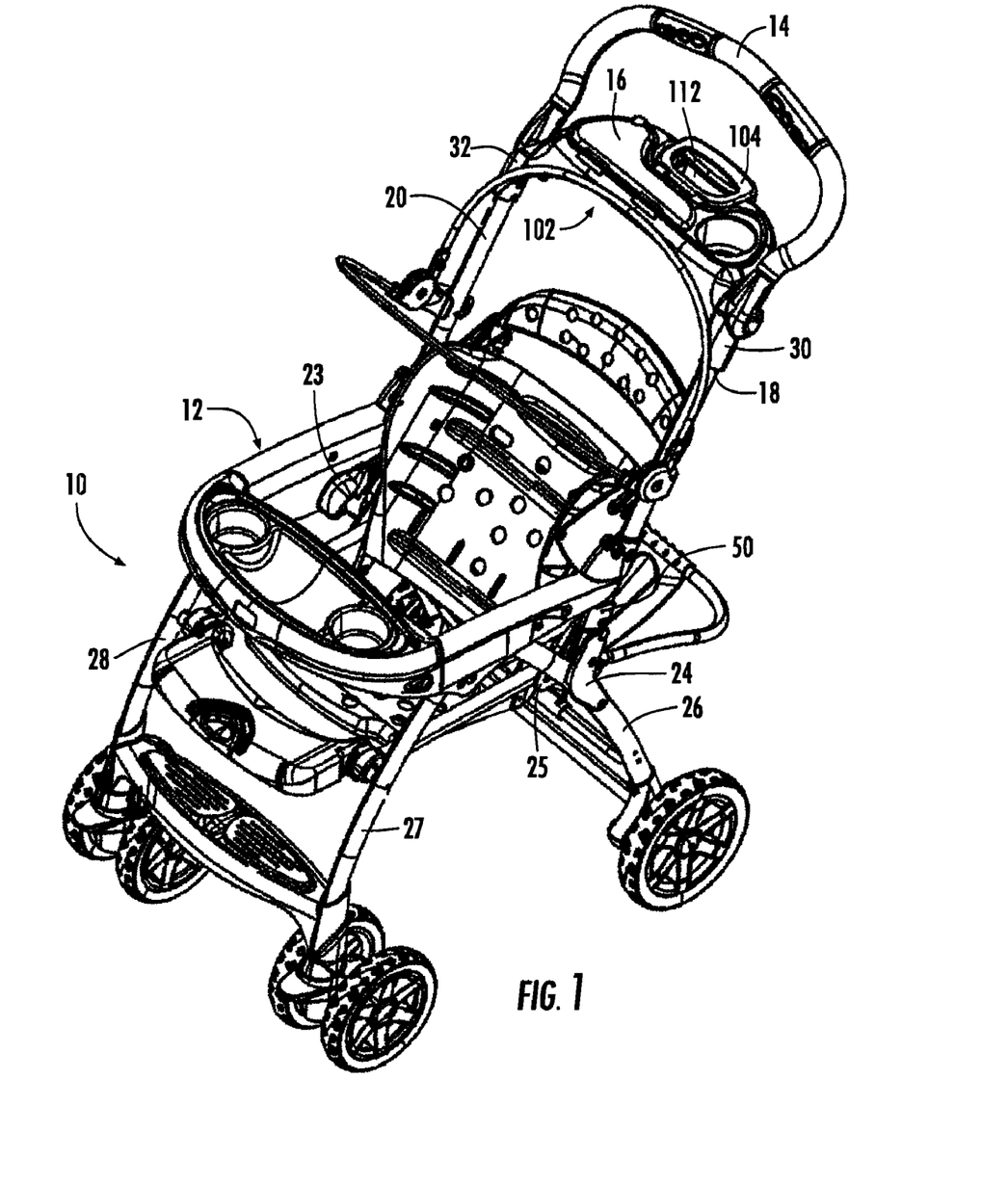
FIG. 1 is a perspective view of the stroller of the present invention with the actuator in the locked position.

Generally referring to FIG. 1, the folding stroller actuating system of the present invention is configured to be attached to a foldable stroller 10, such as that described in U.S. Patent Publication No. 2005/0242549. The foldable stroller 10 has a frame 12 capable of being converted between an operating condition and a folded condition.

In a preferred embodiment, the frame 12 is generally comprised of an operator handle 14, operator tray 16, left and right handle support rails 18, 20, and leg rails 26, 27, 28, 29. Left and right rail connectors connect the rear legs 26, 29 of the stroller to the handle support rails 18, 20. Preferably, the rail connectors consist of left outer and inner rail connectors 24, 25 and right outer and inner rail connectors 22, 23. A tray support member 102 (FIG. 5) is mounted between the left and right handle supports 18, 20.

Figure 9:
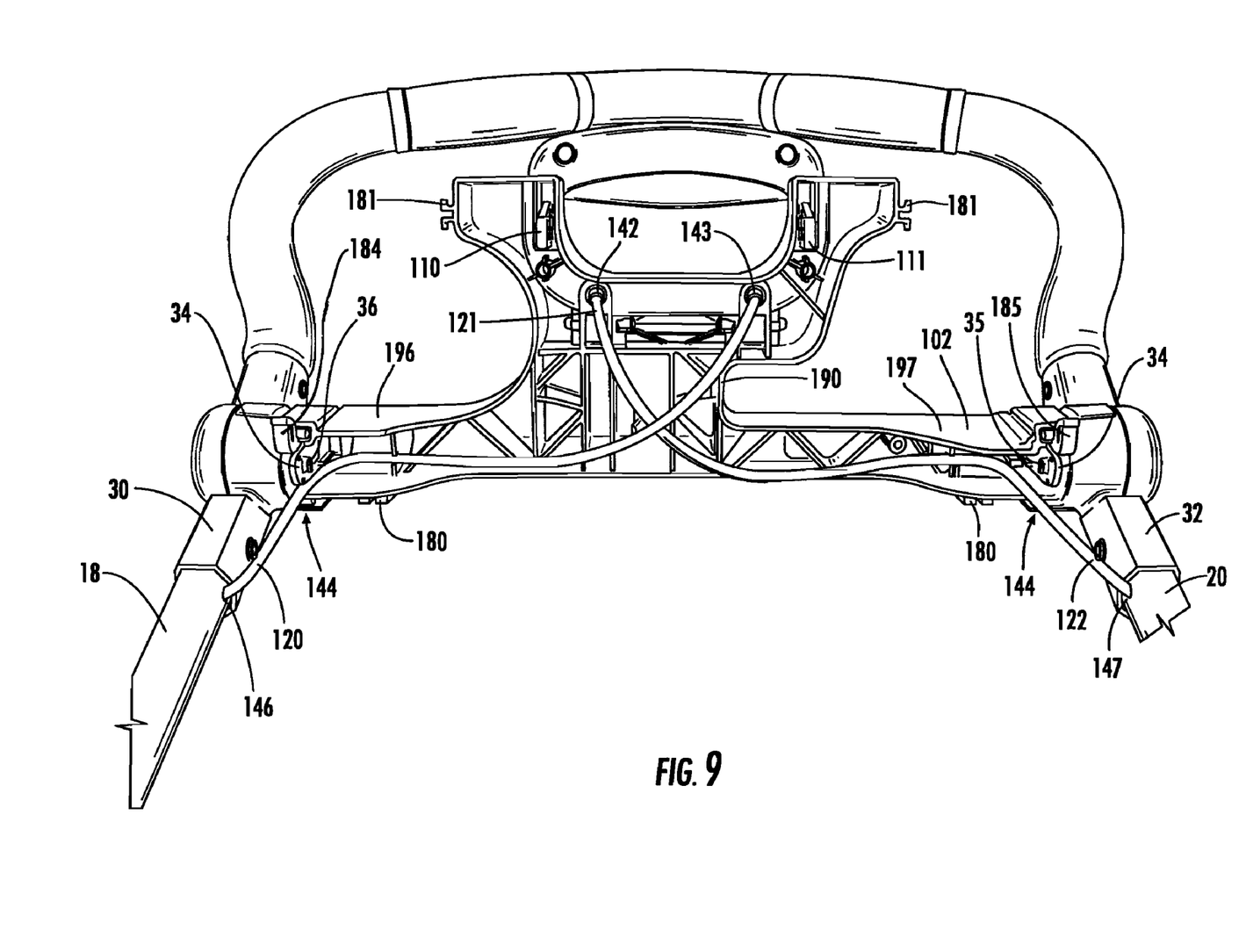
FIG. 9 is a bottom view of the tray support member with a lower-cover removed.

The tray support member 102 is attached to the handle support rails 18, 20 by left and right securing arms 30, 32. As shown in FIG. 9, the tray support member 102 is attached to each the left and right securing arms 30, 32 by securing tabs 34 on the support member 102 to locking projections 36 on the securing arms 30, 32. However, it should be understood that any suitable means to connect the support member 102 to the securing arms 30, 32, such as press fits, snap fits, rivets, fasteners, or other mechanical connections, may be utilized without departing from the scope of the invention. It is further envisioned that the securing arms 30, 32 can be removed from the frame entirely, and the support member 102 attached directly to the left and right handle support rails 18, 20.

The folding stroller actuating system generally comprises the tray support member 102, an actuator 104, at least one linkage (120, 122), and at least one locking mechanism (50, 52). Preferably, left and right linkages are used to connect the actuator 104 to left and right locking mechanisms 50, 52. Preferably, a pivot pin 103 is used to connect the actuator 104 to the tray support member 102. In a preferred embodiment, the actuator 104 is connected to the tray support member 102 in such a manner that it is pivotable relative to the tray support member 102. In a more preferred embodiment, the tray support member is substantially T-shaped, with a portion extending generally rearward. This rearward-extending portion 190 offsets the actuator 104 toward the operator, providing both a more convenient location for engagement of the actuator, as well as providing the operator tray 16 with additional useable space for the storage of personal items.

Figure 2:
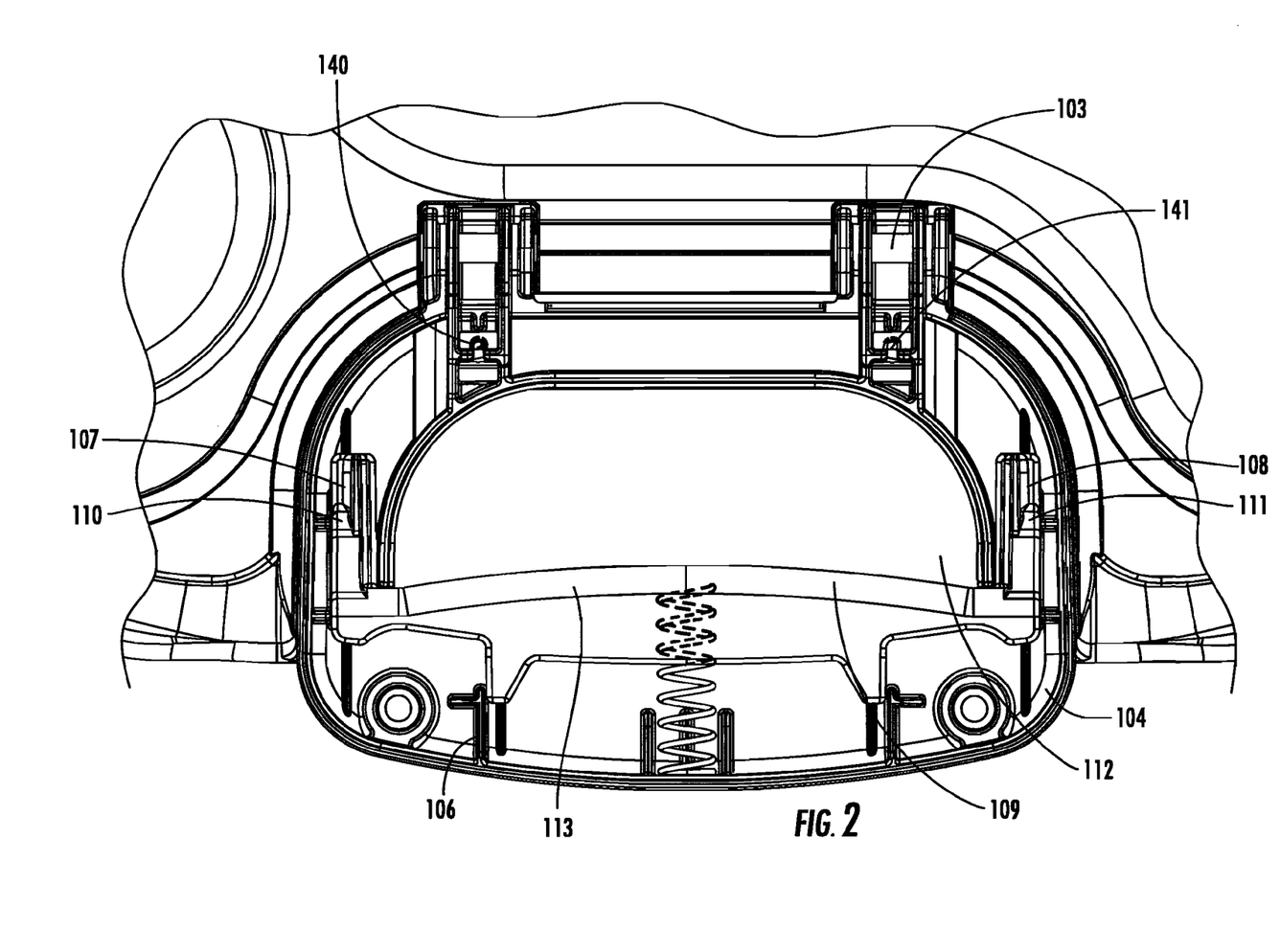
FIG. 2 is a fragmentary view of the actuator with the upper surface of the actuator removed.
Figure 8:
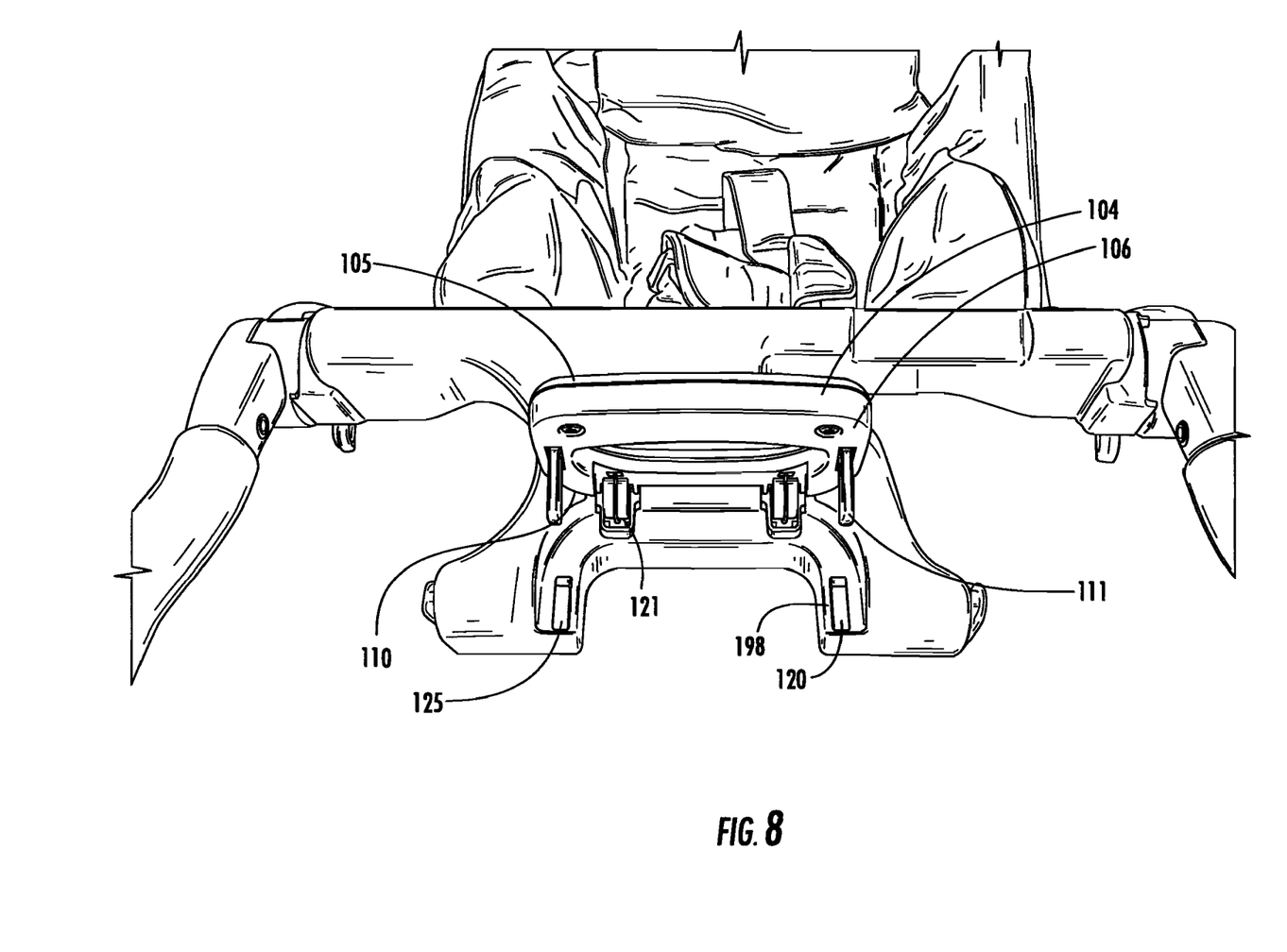
FIG. 8 is a top perspective view of the tray support member with the operator tray removed and the actuator in the unlocked position.

The actuator 104 includes upper and lower surfaces 105, 106. The lower surface 106 includes a left and right side slots 107, 108 (FIG. 2). A release mechanism 109 is secured between the upper and lower surfaces 105, 106 of the actuator 104, with an exposed portion thereof 113 extending toward an opening 112. The release mechanism 109 is preferably spring biased and is configured for slidable movement upon actuation by an operator. The release mechanism 109 further comprises left and right latches 110, 111 slidably arranged within the left and right slots 107, 108 of the lower surface 106 of the actuator 104. The latches 110, 111 are configured to securely engage with the tray support member 102 through complimentary left and right locking slots 125, 126 formed in the upper surface 195 of the tray support member (FIG. 8). The engagement of the latches 110, 111 into the locking slots 125, 126 acts to secure the actuator 104 to the tray support member 102 and prevents inadvertent actuation of the actuator 104.

In a locked position (FIGS. 1, 5, 7, and 9), the actuator 104 is oriented substantially flush to, and engaged with, the tray support member 102. A user can depress the release mechanism 109 of the actuator 104 to slide latches 110, 111 releasing their engagement with the tray support member slots 125, 126.

Figure 3:
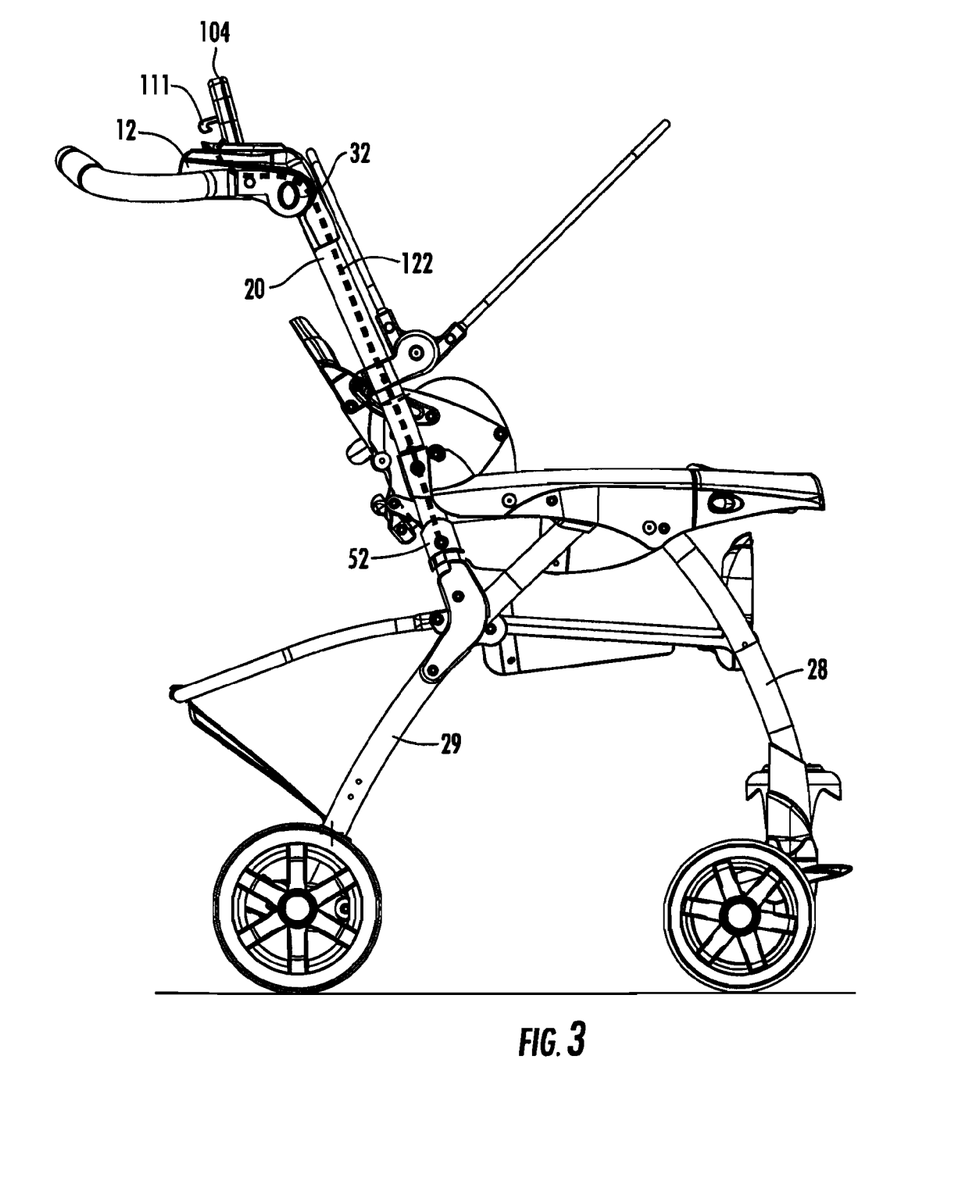
FIG. 3 is a right side view of the stroller illustrating the actuator in the unlocked position and a locking member disengaged from a complimentary portion of a rail connector.
Figure 4:
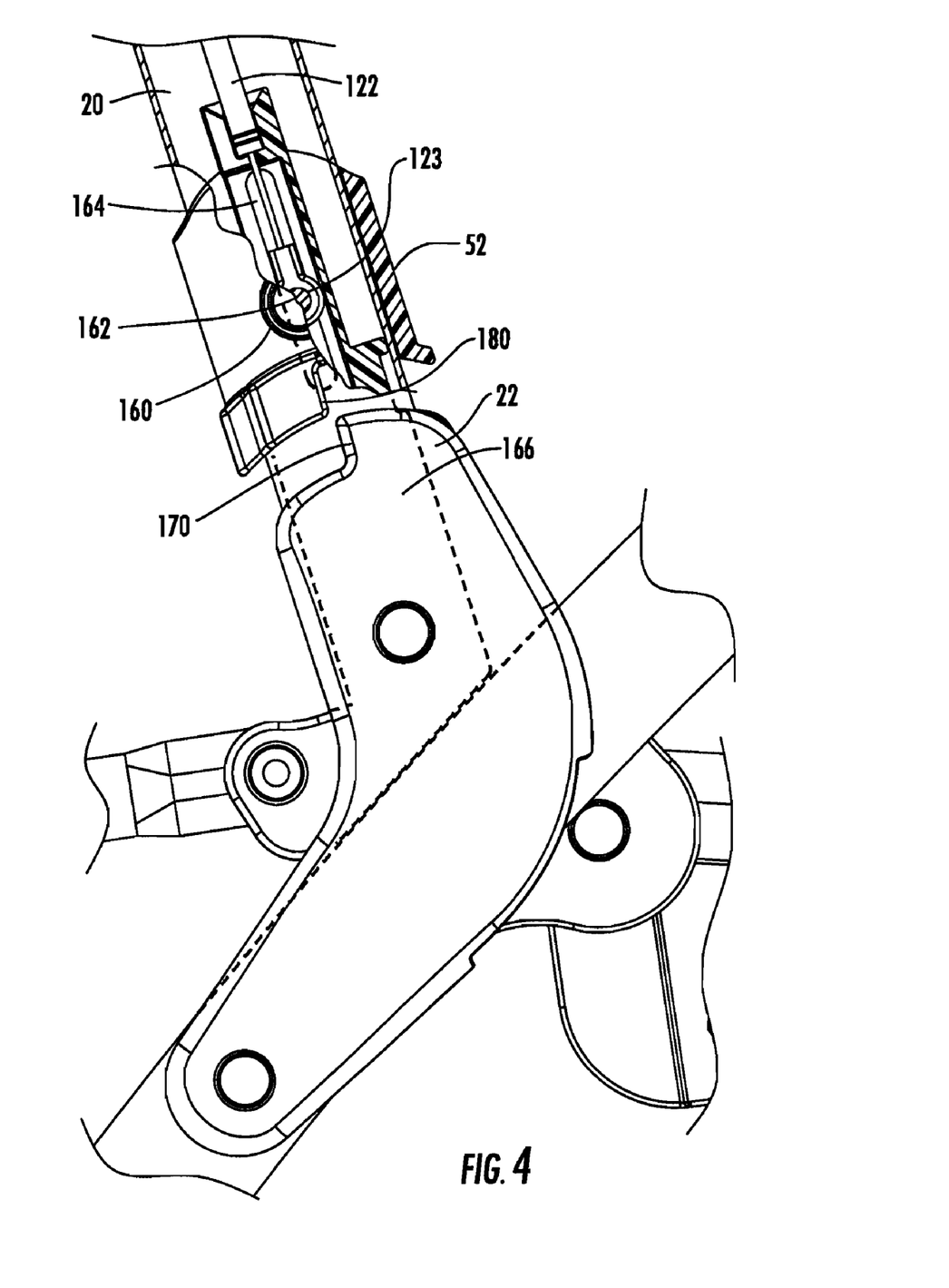
FIG. 4 is an enlarged view of the locking member and rail connector of FIG. 3.
Figure 5:
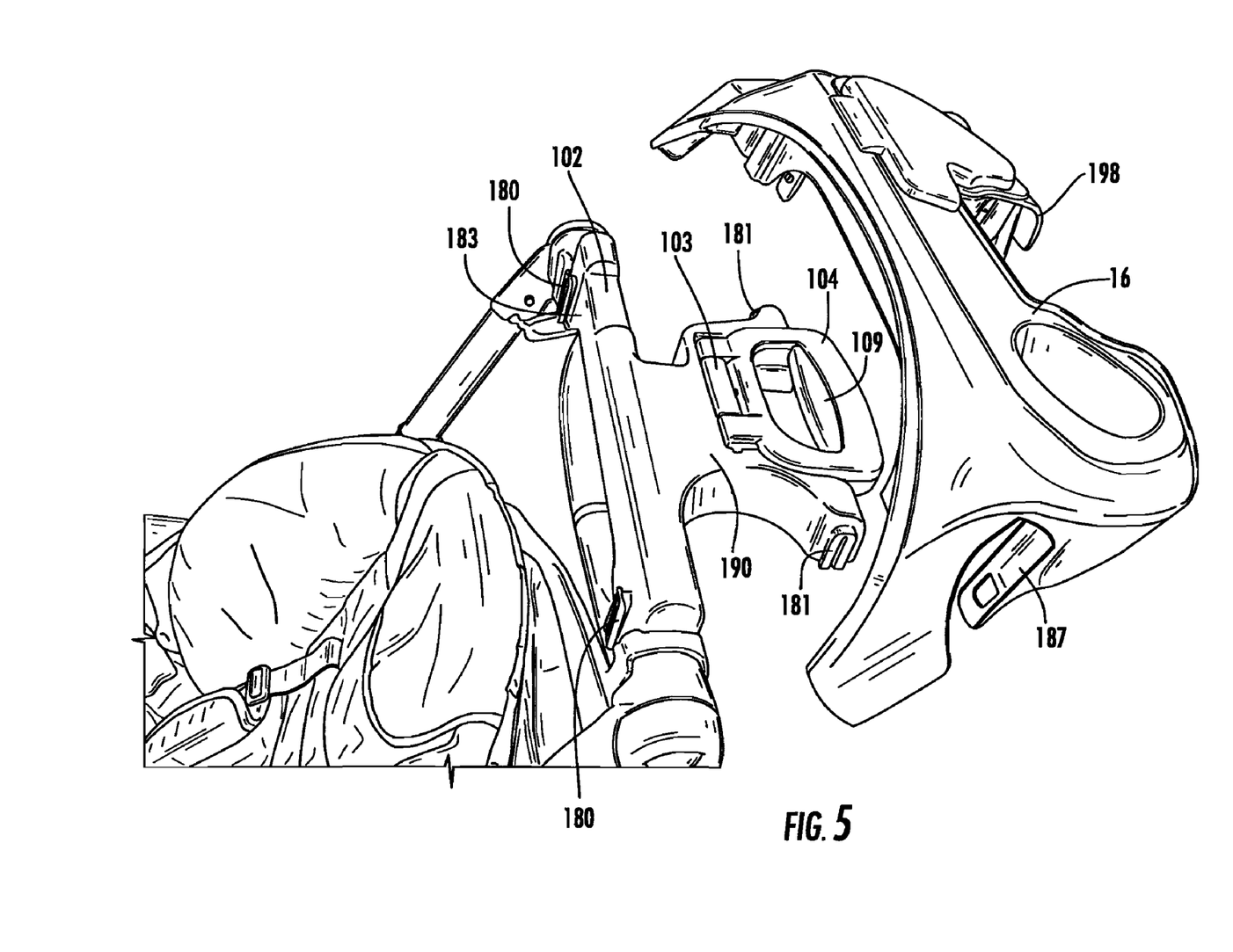
FIG. 5 is a perspective view of the preferred embodiment of the present invention showing the upper portion of the stroller with the operator tray removed from the tray support member.
Figure 6:
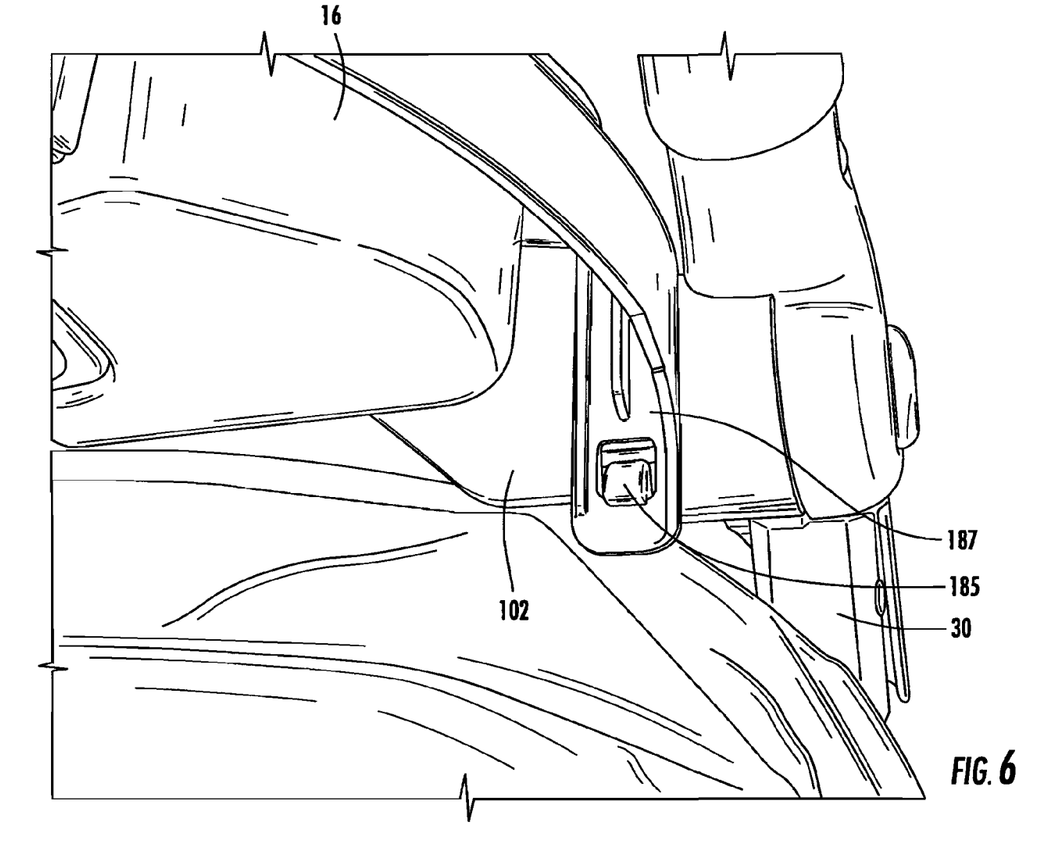
FIG. 6 is a perspective view of the underside of the operator tray engaged with the tray support member.
Figure 7:
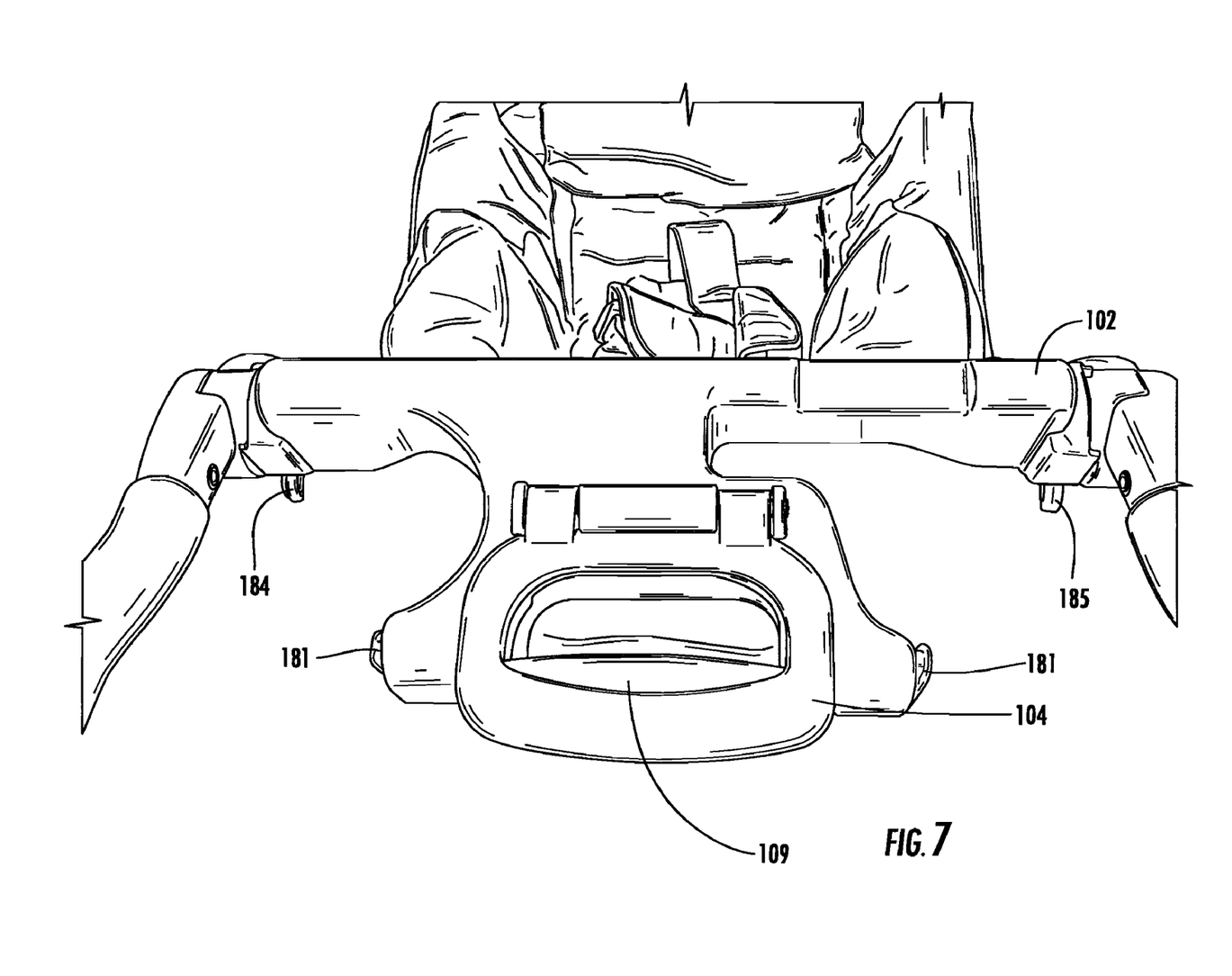
FIG. 7 is a top view of the tray support member with the operator tray removed and the actuator in the locked position.

Referring to FIGS. 4 and 9, the left and right linkages 120, 122 of the actuating assembly have first and second ends 121, 123. Working from the first end 121 toward the second end 123 of each linkage, 120, 122, the first end 121 of each linkage 120, 122 is secured to the actuator 104 between the upper and lower surfaces 105, 106 of the actuator 104. Each linkage 120, 122 extends from the interior of the actuator 104 through one of a pair of opposed apertures 140, 141 in the lower surface 106 of the actuator 104 and enters the tray support member 102 through one of a pair of opposed apertures 142, 143 in the tray support member. Each of the linkages 120, 122 preferably extends to a respective end 196, 197 of the tray support member 102, exits through an aperture 144 created between the tray support member 102 and the left and right securing arms 30, 32, and enters each respective handle support rails 18, 20 via another pair of apertures 146, 147 formed thereon. Each linkage 120, 122 preferably extends through its respective handle support rail 18, 20 where the linkages 120, 122 are attached to locking mechanisms 50, 52, respectively (FIGS. 3 and 4). One of ordinary skill in the art will appreciate that the linkages 120, 122 can be routed form the actuator 104 to the locking mechanisms 50, 52 in any suitable manner without being limited to the preferred embodiment. For example, any portion of the linkages 120, 122 can be exposed as opposed to being routed through the tray support member 102 or the left and right securing arms 30, 32.

The linkages preferably comprise Bowden cables, although any suitable mechanical link, such as rigid or flexible rods or standard cables may be used without departing from the scope of the present invention.

The locking mechanisms 50, 52 may comprise any number of appropriate assemblies which are capable of selectively securing the stroller handle support rails to the rear legs through the application of a unidirectional force applied by a cable or other suitable mechanical link. Examples of usable systems are described in U.S. Patent Publication No. 2005/0242549, U.S. Pat. No. 6,478,327, and U.S. Pat. No. 6,255,740, the disclosures of which are herein incorporated by reference.

Figure 11:
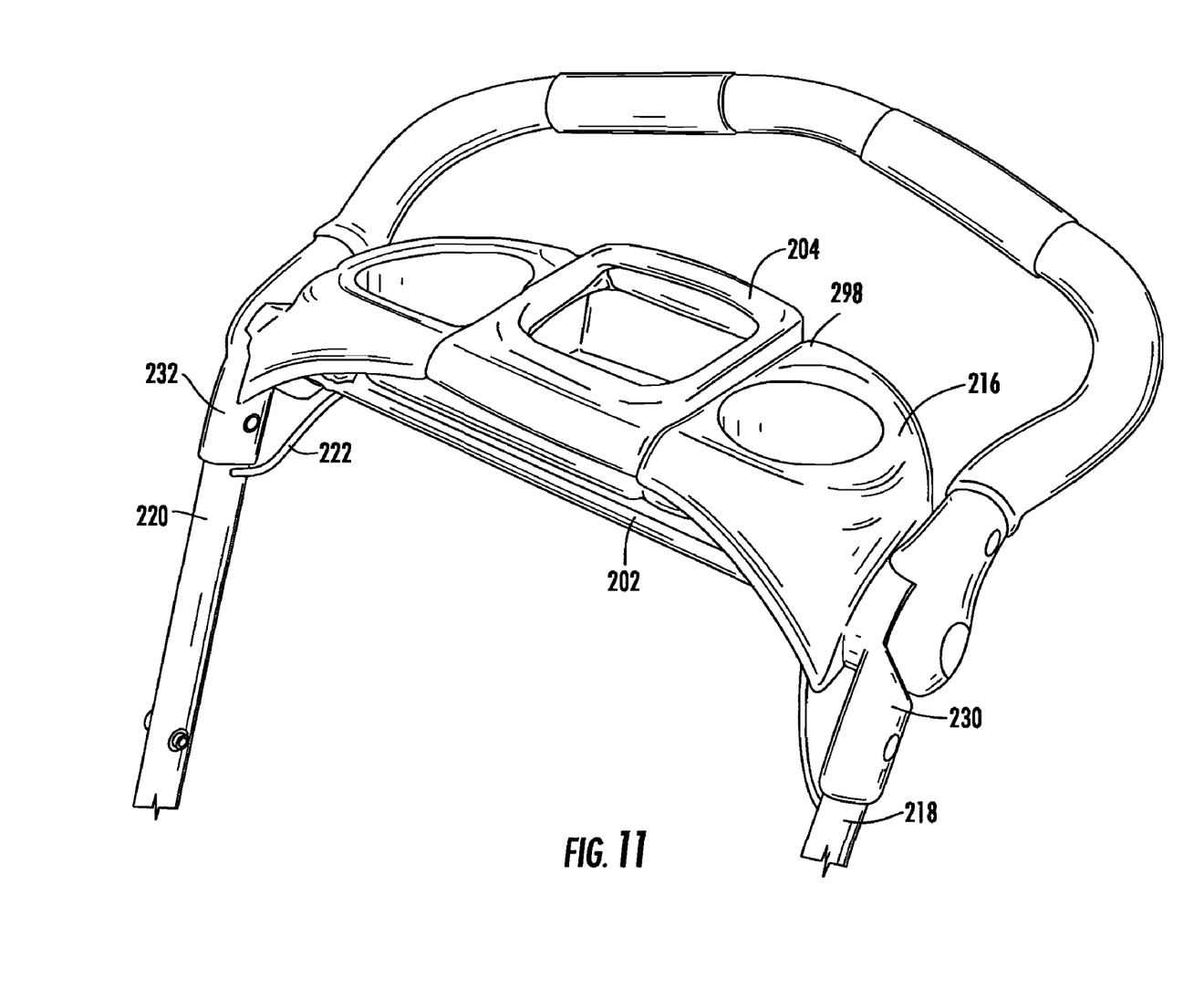
FIG. 11 is a perspective view of the second embodiment depicting the actuator and operator tray of the present invention in the locked position.

Referring generally to FIG. 4, the connection between locking mechanism 52 and linkage 122 will be discussed with reference to FIGS. 3 and 4; however, the connection between the locking mechanism 50 and cable 120 is the same. The locking mechanism 52 contains a pair of opposed apertures 160 (only one being shown) to receive a fastener 162 which extends through an ovate aperture 164 in the handle support rail 20 to secure the locking mechanism 52 to handle support rail 20. The linkage 122 is also coupled to the fastener 162. The locking mechanism 52 is biased, by a spring or other means, to be positioned at the lower portion of ovular aperture 164. When a user pivots actuator 104 upwardly as shown in FIGS. 3, 8, and 11, to fold the stroller 10, tension applied to cable 122 causes it to be pulled upwardly, and, thereby causes the locking mechanism 52 to slide upwardly along ovate aperture 164. When actuator 104 is returned to rest position (FIGS. 1, 2, 7, and 9), the locking mechanism 52 returns to the lower portion of ovate aperture 164.

Referring still to FIG. 4, each handle support rail 18, 20 is preferably pivotally secured to each rail connector 22, 23, 24, 25. The outer rail connector 22 is preferably boomerang shaped, and has an upper end 166, respectively. The upper end 166 of the rail connector 22 has an abutting projection 170 configured to abut a complimentary abutting projection 180 on the locking mechanism 52 when the locking mechanism 52 is in the rest condition. This engagement between the locking mechanisms 50, 52 and the rail connectors 22, 23, 24, 25 keeps the stroller 10 locked in the unfolded position.

Tension placed on the linkage 122 by rotation of the actuator 104 urges the locking mechanism 52 to slide along the rail connector 22 thereby disengaging to the locking mechanism 52 from the rail connector 22 and permitting the stroller 10 to be folded in any number of prescribed manners, such as that disclosed in U.S. Patent Publication No. 2005/0242549.

In a preferred embodiment, the operator tray 16 is removably attached to of the tray support member 102. The operator tray 16 is preferably guided into position on top of the tray support member 102 by first and second pairs of guides 180, 181. The first pair of guides 180 is located on a forward facing surface 183 of the tray support member 102, and the second pair 181 located on the rear of the tray support member 102. The guides correspond to complimentary fastening features formed on the underside of the operator tray 16. The operator tray 16 is preferably removably attached to the tray support member by locking tabs 187 on the operator tray 16 that engage complementary locking projections 185 located on tray support member 102. One of ordinary skill in the art would recognize that other suitable mechanisms can be used to removably attach the operator tray 16 to the tray support member 102 without departing from the spirit of this invention. The operator tray 16 has at least one recess 198 to permit the actuator 104 to be exposed for user activation.

When the operator tray 16 is properly secured to the tray support member 102 it covers the majority of the tray support member 102 and the actuator 104 is received within the recess 198 to be substantially flush with the top surface 195 of the operator tray 16. This improves the aesthetic appearance of the stroller as the operator tray 16 and the actuator 104 appear to be part of a single unit. Moreover, because the actuation system is not mounted to the operator tray, the tray remains removable from the stroller, facilitating cleaning and/or replacement of the tray.

Figure 10:
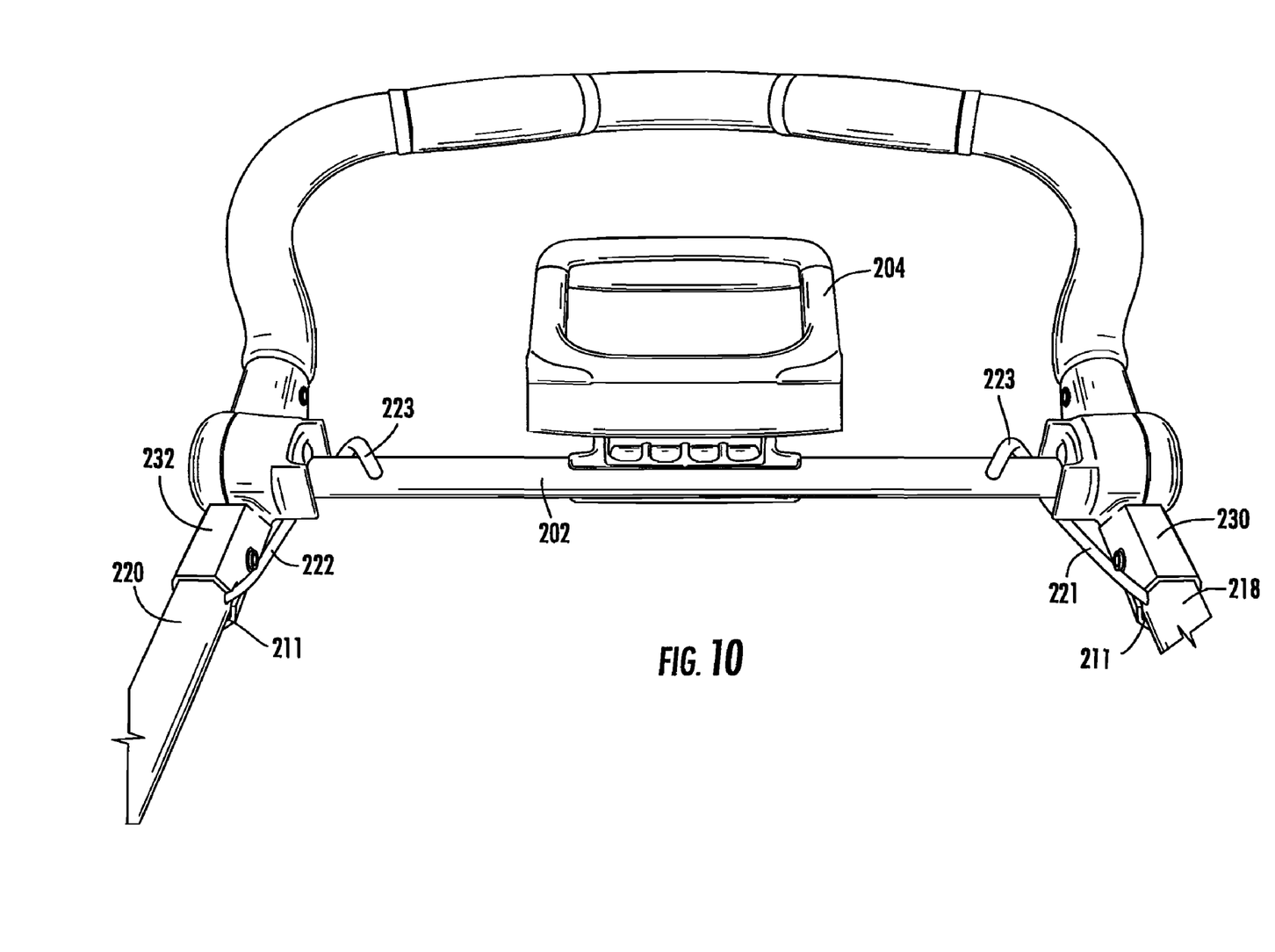
FIG. 10 is a perspective view of a second embodiment of the actuating system.
Figure 12:
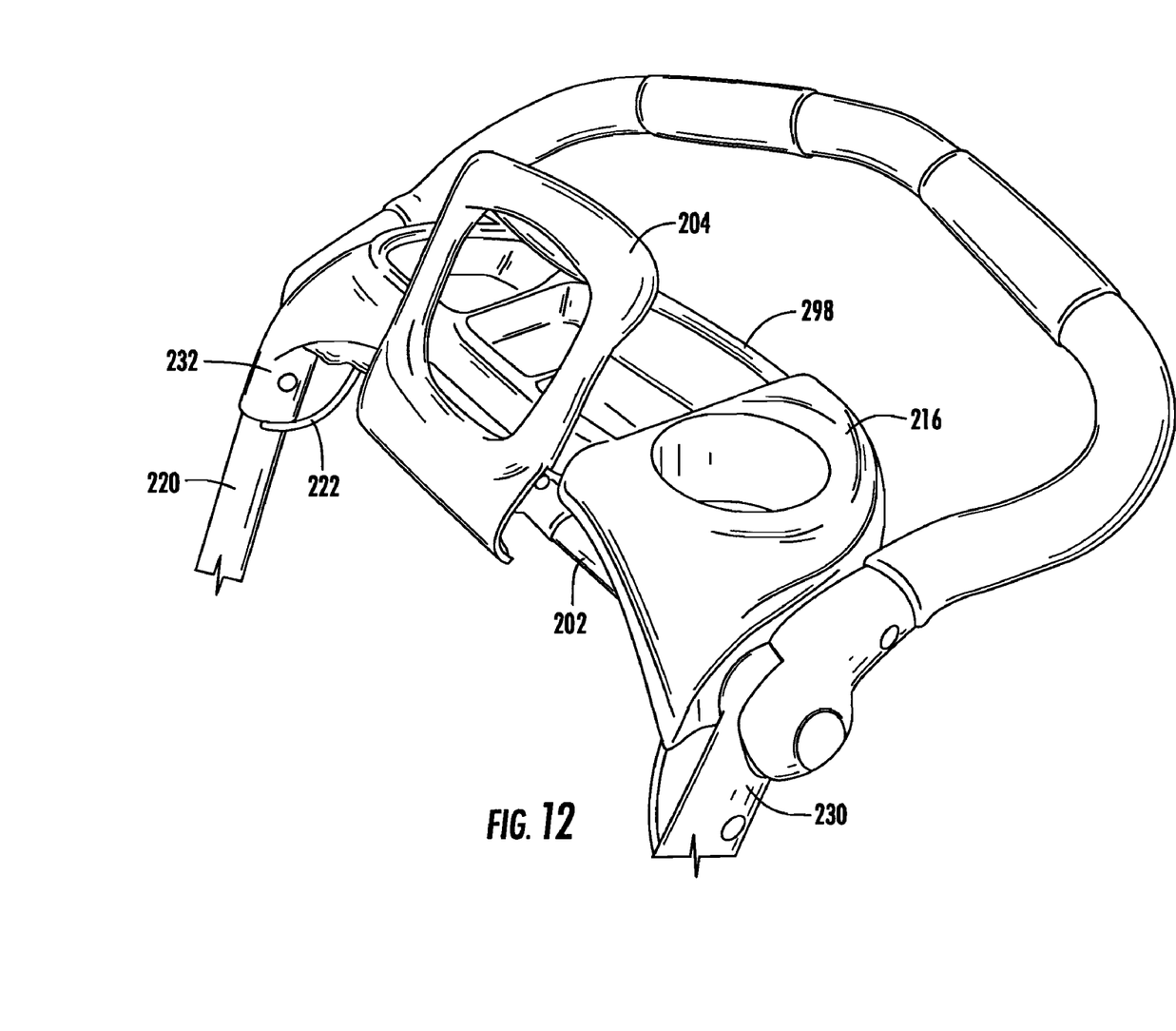
FIG. 12 is a perspective view of the second embodiment showing the actuator in the unlocked position.

Referring generally to FIGS. 10-12, a second embodiment of the present invention is shown having left and right handle supports 218, 220, preferably hollow, between which a support bar 202 is rotatably coupled. Left and right linkages 220, 222 are attached on a first end 221 to the support bar 202. The linkages 220, 222 are inserted into openings 211 on the handle supports 218, 220, and attached on a second end 223 to a locking mechanism, preferably of the type described above with respect to FIG. 4. An actuator 204 is secured to the support bar 202 facilitating the application of a rotational force on the support bar 202 which in turn tensions the linkages 220, 222 for releasing the locking mechanisms.

FIG. 11 shows the second embodiment with the one hand actuator 204 in the locked position and an operator tray 216 installed. The operator tray 216 is installed over the support bar 202 and is preferably removably attached to left and right handle support rails 218, 220 or to left and right securing arms 230, 232 by way of a mechanical connection, such as that described above with respect to the first embodiment. The operator tray preferably comprises at least one recess 298 configured to accept at least one portion of the actuator 204, thus providing a uniform profile so as not to disrupt the usefulness of the tray or further interfere with the operator while the stroller is in use. Moreover, the operator tray 216 provides a cover for the support bar 202 and the cables 220, 222, ensuring their unobstructed action as well as an added measure of safety to the user.

With the actuator 204 positioned adjacent to the operator tray 216, the linkages 220, 222 are not tensioned, and the locking mechanisms secure the stroller in a use position.

FIG. 12 shows the second embodiment with the actuator 204 in the unlocked position. Rotating the actuator 204 toward the front of the stroller provides tension on the cables 220, 222 as they wrap around the support bar 202. This tension acts to release the locking mechanisms, allowing the stroller to fold.

Having thus described in detail the preferred embodiment of the present invention, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A foldable stroller frame comprising:
    left and right front legs and left and right rear legs, each leg having a wheel mounted thereto;
    an operator handle having left and right support rails extending therefrom, the left and right support rails connected to the left and right rear legs;
    at least one locking member movably connected to at least one of the left and right support rails, the at least one locking member biased toward a locking position to secure the connection between the left and right support rails and the left and right rear legs;
    a support member comprising an upper surface, a lower surface, a linear horizontal member having left and right ends defining a central portion, the left end connected to the left support rail and the right end connected to the right support rail, and a extension portion extending rearwardly from the central portion, the support member positioned apart from the operator handle;
    an actuator connected to the extension portion of the support member, the actuator is movable from a first position to a second position to actuate folding of the stroller;
    at least one linkage coupling the actuator to the at least one locking member; and
    an operator tray that is independent of the actuator and is removably connected to the support member, the operator tray defines a slot that receives at least a portion of the actuator, the operator tray overlays and conceals substantially the entire upper surface of the support member;
    wherein the actuator remains movable to actuate folding of the stroller when the operator tray is connected to the support member and when the operator tray is removed from the support member.

2. The foldable stroller frame of claim 1, wherein the left and right support rails are hollow tubular structures defining an interior passage therethrough and the linkage extends from the support member through the interior passage of at least one of the left and right support rails to the at least one locking member.

3. The foldable stroller of claim 2, wherein the at least one linkage extends from the actuator into an interior portion of the support member.

4. The foldable stroller frame of claim 1, wherein at least one linkage is a cable.

5. The foldable stroller frame of claim 1, further comprising left and right locking members and left and right linkages.

6. The foldable stroller frame of claim 1, wherein the operator tray has at least one locking tab and the support member has at least one complementary projection for securing the operator tray to the support member.

7. The foldable stroller frame of claim 1, wherein the operator tray includes at least one locating guide engageable with a complimentary guide formed on the support member.

8. The foldable stroller frame of claim 1, wherein the support member is substantially T-shaped, and the actuator is connected to a rearward extending portion of the support member.

9. The foldable stroller frame of claim 1, wherein the actuator is pivotably connected to an upper surface of the support member.

10. The foldable stroller frame of claim 9, wherein rotation of the actuator disengages the at least one locking assembly from the connection between the rear legs and the support rails.

11. The foldable stroller frame of claim 10, wherein the right and left support rails are pivotal relative to the rear right and left legs.

12. The foldable stroller frame of claim 1, wherein actuation of the actuator disengages the at least one locking assembly from the connection between the rear legs and support rails to permit the support rails to pivot relative to the rear legs to fold the stroller.

13. The foldable stroller frame of claim 1, wherein an upper surface of the actuator is substantially flush with an upper surface of the operator tray.

14. The foldable stroller frame of claim 1, wherein the support member is rotatably connected to the support rails and the actuator is securely connected to the support member such the actuator rotates in unison with the support member.

15. The foldable stroller of claim 1, wherein the support bar has a pair of guide extensions and the operator tray has a complementary pair of receiving extensions positioned on an underside of the operator tray to removably connect the operator tray to the support bar.

16. An actuator assembly for a foldable stroller frame, comprising:
   a stroller frame comprising:
      left and right front legs and left and right rear legs, each leg having a wheel mounted thereto;
      an operator handle having left and right support rails extending therefrom, the left and right support rails pivotally connected to the left and right rear legs;
      a support member having an upper surface, a lower surface, a linear horizontal member having a central portion, a left end connected to the left support rail, and a right end connected to the right support rail, and an extension portion extending rearwardly from the central portion, the support member positioned apart from the operator handle;
      an operator tray that is removably connected to the support member, the operator tray conceals the support member and covers substantially the entire upper surface of the support member, the operator tray defining at least one recess;
      at least one locking member movably connected to at least one of the rear left and right support rails, the at least one locking member biased toward a locking position to secure the connection between the left and right support rails and the left and right rear legs;
      an actuator control rotatably connected to the extension portion of the support member to actuate folding of the stroller frame, the actuator control is positioned on the support member independent of the operator tray and at least a portion of the actuator control is received within the recess of the operator tray; and
      at least one linkage coupling the actuator control to the at least one locking member;
      wherein the actuator control is rotatable to actuate folding of the stroller frame when the operator tray is connected to the support member and when the operator tray is removed from the support member.

17. The actuator assembly of claim 16, wherein rotation of the actuator disengages the at least one locking assembly from the connection between the rear legs and support rails to permit the support rails to pivot relative to the rear legs to fold the stroller.

18. A method of folding a stroller comprising:
   providing a stroller frame with left and right front legs, left and right rear legs, left and right handlebar supports pivotally connected to the left and right rear legs, an operator handlebar connected to the left and right handlebar support, and a support bar extending between the left and right handlebar supports and positioned apart from the operator handlebar;
   the support bar having a linear horizontal member having a central portion, a left end connected to the left handlebar support, and a right end connected to the right handlebar support, and an extension portion extending rearwardly from the central portion;
   providing an actuator connected to the extension portion of the support bar and movable between a first and a second position;
   providing an operator tray independent of the actuator and removably connected to the support bar such that the actuator remains movable when the operator tray is connected to the support bar and when the operator tray is removed from the support bar, the operator tray covering and concealing substantially an entire upper surface of the support bar, the operator tray defining a slot that receives at least a portion of the actuator;
   providing at least one locking member securing the connection between the left and right handlebar supports and the left and right rear legs;
   providing at least one linkage between the actuator and the at least one locking member; and
   rotating the actuator from the first position to the second position to disengage the locking member from the connection between the left and right handlebar supports and the left and right rear legs; and
   pivoting the left and right handlebar supports relative to the left and right rear legs to fold the stroller.

* * * * *

UNITED STATES PATENT AND TRADEMARK OFFICE
CERTIFICATE OF CORRECTION

| | |
|---|---|
| PATENT NO. | : 8,262,124 B2 |
| APPLICATION NO. | : 12/263792 |
| DATED | : September 11, 2012 |
| INVENTOR(S) | : Longenecker et al. |

Page 1 of 1

It is certified that error appears in the above-identified patent and that said Letters Patent is hereby corrected as shown below:

In claim 3, at column 7, line 4, after the word "stroller" insert --frame--.

In claim 15, at column 7, line 45, after the word "stroller" insert --frame--.

Signed and Sealed this
Twentieth Day of November, 2012

David J. Kappos
*Director of the United States Patent and Trademark Office*